United States Patent Office 3,141,880
Patented July 21, 1964

3,141,880
PREPARATION OF TERTIARYAMINO
UNSATURATED KETONES
James C. Martin, Kingsport, Tenn., assignor to Eastman Kodak Company, Rochester, N.Y., a corporation of New Jersey
No Drawing. Filed July 26, 1961, Ser. No. 126,876
6 Claims. (Cl. 260—247.7)

This invention relates to a novel organic synthesis, and more particularly to a novel method for preparing certain open-chain tertiaryamino unsaturated ketones.

Compounds produced by the method of the invention are tertiaryamino unsaturated ketones, which can be represented by the general formula:

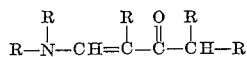

Such compounds are valuable as chemical intermediates. They are useful, for example, in the preparation of substituted pyrazoles, which in turn have a number of uses, for example, as stabilizers in poly(vinyl chloride) formulations. Ketones of this type, wherein the substituents, R, are methyl radicals, were prepared by E. Benary [Ber. 63, 1573 (1930)] by a method employing the following reaction:

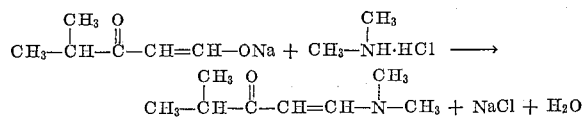

The Benary method is of purely academic interest because of the high cost and scarcity of the hydroxymethylene ketones required as starting materials. I have now developed a novel method for preparing ketones of the type indicated employing a reaction which can be represented by the following equation:

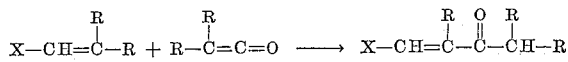

wherein X is a tertiary amine radical and at least one of the substituents, R, is hydrogen. My novel method uses readily available and inexpensive enamines and ketenes as starting materials and is further characterized by high yields of the desired product and simple operating conditions.

The method of my invention, in general, comprises reacting an enamine of the formula,

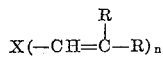

with a ketene of the formula,

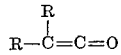

at a temperature above 10° C. and sufficiently high to form an open-chain, substituted butenone of the formula:

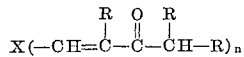

wherein the substituents, R, of the enamine are hydrogen or monovalent organic radicals or divalent organic radicals which, together with the β-carbon atom of the enamine, form an organic ring; wherein the substituents, R, of the ketene are hydrogen or monovalent organic radicals or divalent organic radicals which, with the α-carbon atom of the ketene, form an organic ring; wherein at least one of said substituents, R, is a hydrogen atom; and wherein X is a tertiary amine radical having a nitrogen atom attached to the adjacent carbon atom. The substituent X typically has the formula:

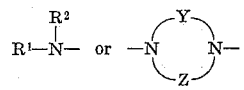

wherein $R^1$ and $R^2$ are monovalent organic radicals or divalent organic radicals which, with the nitrogen atom, form a heterocyclic ring; and wherein Y and Z are alkylene radicals having 2 to 4 carbon atoms and form such ring structures as piperazine and methyl-substituted piperazine rings. When X is

$n$ is 1 and when X is

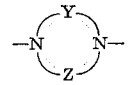

$n$ is 2.

In the above formulas, the substituents, R, of the enamine and ketene are typically: (a) alkyl radicals having 1 to 18 carbon atoms; (b) phenyl radicals; (c) thienyl radicals; (d) allyl radicals; (e) carbon and hydrogen atoms which, with the β-carbon atom of the enamine and with the α-carbon atom of the ketene, form a carbocyclic ring containing 5 to 7 carbon atoms such as phenyl, cyclopentane, cyclohexane, norbornane, norbornene and related rings; (f) carbalkoxy radicals wherein the alkoxy moiety has 1 to 8 carbon atoms; (g) carbon, hydrogen and oxygen atoms which, with the β-carbon atom of the enamine and with the α-carbon atom of the ketene, form a heterocyclic ring having 5 carbon atoms and an oxygen atom such as pyran rings and the like; or (h) hydrogen, and at least one of said substituents, R, must be hydrogen. $R^1$ and $R^2$ are typically: (a) alkyl radicals having 1 to 8 carbon atoms; (b) carbon and hydrogen atoms which, together with the nitrogen atom, form a heterocyclic ring containing 4 to 8 carbon atoms such as piperidine, methyl-substituted piperidines, pyrrolidine, 3-azabicyclo[3.2.2]nonane and related rings; or (c) carbon, hydrogen and oxygen atoms which, together with the nitrogen atom, form a morpholine ring.

The ketene reactant of the method of the invention can be ketene ($H_2C=C=O$), a monosubstituted or aldoketene ($RCH=C=O$), or a disubstituted or ketoketene ($R_2C=C=O$). Such compounds can be prepared by methods known in the art, for instance, by methods described in "Organic Reactions," John Wiley and Sons, Inc., N.Y. (1946), vol. III, chapter 3. The disubstituted

stituted Cyclobutanones," filed May 26, 1961, describes the preparation of novel substituted cyclobutanones by the reaction of enamines with ketenes wherein the enamine has at least one β-hydrogen atom or the ketene has at least one α-hydrogen. The cyclic compounds are intermediates in at least some of the reactions in accordance with the present invention. In the process of said application Serial No. 112,789, the cyclic reaction products are formed and maintained at low temperature to avoid cleavage of the cyclobutanone ring. In the present method, the reaction of the enamine with the ketene, and/or the subsequent treatment of the reaction product, is carried out at a temperature above 10° C., and in any event, at a temperature sufficiently high to effect cleavage of any cyclobutanone intermediate and produce the open-chain ketone,

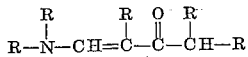

as the principal reaction product.

The reaction of the enamine and ketene proceeds readily in the absence of catalyst materials. It can be conveniently effected by merely combining the reactants at room temperature. Reaction temperatures in the range of about 10° C. to 200° C. can be utilized, although reaction temperatures of about 10° C. to 100° C. are preferred. The optimum reaction temperature varies with such factors as the thermal stability of the desired product and the reactivities of the enamine and the ketene, the higher temperatures being preferred for the higher molecular weight reactants. In any event, the temperature must be sufficiently high to effect cleavage of any intermediate substituted cyclobutanone and form the desired open-chain products of the formula,

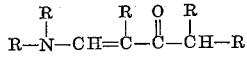

The molar proportion of the enamine reactant to the ketene can be widely varied but substantially stoichiometric amounts of the reactants are generally utilized in accordance with usual chemical practice. However, in the case of ketenes which readily dimerize, I prefer to utilize an excess of the enamine to reduce the amount of ketene dimer by-product.

The reaction time can be widely varied. Typical reaction times vary from a few minutes to 24 hours to several days, the reaction time varying with such variables as the reaction temperature and the reactivity of the reactants. The reaction is conveniently effected under atmospheric pressure, although higher pressures of subatmospheric pressures can be utilized.

The reaction can be run with or without a solvent. However, I prefer to employ a solvent to aid in dissipating the heat of reaction and to make the reaction mixture more fluid. The solvent should be one that dissolves the reactants but does not react with them. Typical reaction solvents include aliphatic esters such as ethyl acetate, aliphatic nitriles such as acetonitrile, ethers such as diethyl ether and diisopropyl ether, chlorinated aliphatic hydrocarbons such as chloroform and carbon tetrachloride, and aliphatic and aromatic hydrocarbons such as n-hexane, n-octane, benzene and toluene.

The reaction of the described enamines and ketenes proceeds in high yields to form the described open-chain tertiaryamino ketones. The product can be worked-up or purified by conventional purification methods, the preferred method varying with the properties of the product. Particularly effective purification methods include fractional distillation under reduced pressure and fractional crystallization from solvents. However, other purification methods such as solvent extraction, chromatographic adsorption and the like can be utilized.

The invention is further illustrated by the following examples:

EXAMPLE 1

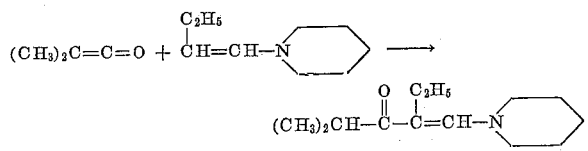

To a stirred solution of 139 g. (1.0 mole) of N-(1-butenyl)piperidine in 400 ml. of ether under nitrogen was added 70 g. (1.0 mole) of dimethylketene over a period of 15 min. The temperature of the exothermic reaction was maintained between 15 and 25° C. by the use of an ice bath. The reaction mixture was stirred for 30 min. after the addition and then distilled through a 10-in. packed column to give 172 g. (82%) of 2-ethyl-4-methyl-1-piperidino-1-penten-3-one, B.P. 119–121° C. (0.6 mm.), $n_D^{20}$ 1.5424.

*Analysis.*—Calcd. for $C_{13}H_{22}NO$: C, 74.6; H, 11.0; N, 6.7. Found: C, 74.3; H, 10.9; N, 6.6.

The identity of the product of Example 1 was conclusively established by degrading it to a known compound, according to the following example.

EXAMPLE 2

A mixture of 52.2 g. (0.25 mole) of 2-ethyl-4-methyl-1-piperidino - 1 - penten - 3 - one (prepared as described above), 20 g. (0.5 mole) of sodium hydroxide and 200 ml. of water was refluxed, with stirring, for 10 hrs. After cooling, the reaction mixture was extracted twice with 500 ml. portions of ethyl ether. The combined ether solutions were dried over anhydrous magnesium sulfate and distilled to give piperidine and 21.4 g. (75%) of 2-methyl-3-hexanone, B.P. 132–134° C. The infrared spectrum of this ketone was identical to the spectrum of an authentic sample of 2-methyl-3-hexanone.

EXAMPLE 3

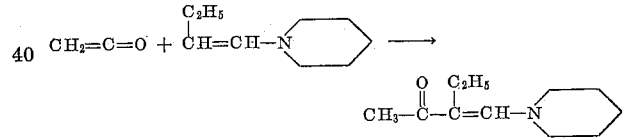

To a stirred solution of 139 g. (1.0 mole) of N-(1-butenyl)-piperidine in 400 ml. of benzene was added ketene until a weight increase of 42 g. (1.0 mole) took place. The temperature of the exothermic reaction was kept at 10 to 25° C. by means of an ice bath. The reaction solution was distilled through a 10-in. packed column to give 126.4 g. (70%) of 2-ethyl-1-piperidino-1-buten-3-one, B.P. 137° C. (0.3 mm.), $n_D^{22}$ 1.5544.

EXAMPLE 4

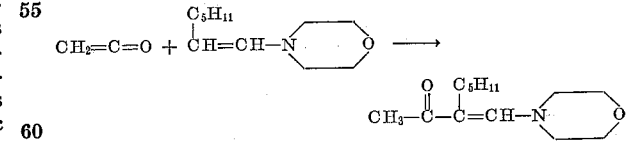

To a stirred solution of 40 g. (0.22 mole) of N-(1-heptenyl)morpholine in 200 ml. of benzene was added ketene until a weight increase of 13.5 g. (0.32 mole) took place. The temperature of the reaction was maintained between 10 and 20° C. The resulting red solution was distilled through a 12-in. packed column to give 29.0 g. (58%) of 1-morpholino - 2 - pentyl-1-buten-3-one, B.P. 160–165° C. (2 mm.).

Using the general method described in Example 1, the following enamines and ketenes gave the products indicated in table I. Section A demonstrates variations in the ketene, section B variations in the aldehyde part of the enamine and section C variations in the amine part of the enamine.

Table I

| Ketene | Enamine | Product | B.P. |
|---|---|---|---|
| A | | | |
| Methylethylketene | N-(1-Butenyl)piperidine | 2-Ethyl-4-methyl-1-piperidino-1-hexen-3-one. | 136° C. (1.5 mm.). |
| Diethylketene | do | 2,4-Diethyl-1-piperidino-1-hexen-3-one. | 132–135° C. (0.4 mm.). |
| Butylethylketene | do | 2,4-Diethyl-1-piperidino-1-octen-3-one. | 163–167° C. (2 mm.). |
| Diphenylketene | do | 2-Ethyl-4,4-diphenyl-1-piperidino-1-buten-3-one. | M.P. 101–103° C. |
| B | | | |
| Dimethylketene | N-(1-Propenyl)piperidine | 2,4-Dimethyl-1-piperidino-1-penten-3-one. | 120–121° C. (1.2 mm.). |
| C | | | |
| Dimethylketene | N-(1-Butenyl)pyrrolidine | 2-Ethyl-4-methyl-1-pyrrolidino-1-penten-3-one. | 140–142° C. (4 mm.). |
| Do | N,N-Dimethyl-1-butenylamine. | 2-Ethyl-4-methyl-1-dimethylamino-1-penten-3-one. | 121° C. (4 mm.). |
| Do | N,N-Dibutyl-1-butenylamine. | 2-Ethyl-4-methyl-1-dibutylamino-1-penten-3-one. | 172–174° C. (1 mm.). |

EXAMPLE 5

$(CH_3)_2N-CH=C(CH_3)_2 + CH_2=C=O \longrightarrow$

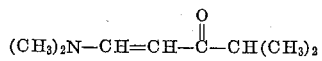

Into a stirred solution of 316 g. (3.2 moles) of N,N-dimethylisobutenylamine in 300 ml. of ethyl ether was passed 180 g. (4.3 moles) of ketene. The exothermic reaction was kept at 20–30° C. by an ice bath. The reaction solution was distilled through a 12-in. packed column to give 409.6 g. (93%) of 1-dimethylamino-4-methyl-1-penten-3-one, B.P. 105–107° C. (2 mm.), $n_D^{20}$ 1.5301.

*Analysis.*—Calcd. for $C_8H_{15}NO$: C, 68.0; H, 10.6; N, 9.9. Found: C, 68.0; H, 10.9; N, 9.7.

Authentic 1-dimethylamino-4-methyl-1-penten-3-one was prepared by the method of Benary [Ber. 63, 1573 (1930)]. The infrared spectra of this material and the compound prepared in Example 5 were identical, thereby verifying the assignment of structure.

EXAMPLE 6

A stream of ketene was passed into 158 g. (1.6 mols) of N,N-dimethylisobutenylamine until a weight increase of 90 g. took place. The reaction temperature was kept at 20–35° C. by an ice bath. The resulting solution was distilled through a 12-in. packed column to give 223 g. (90%) of 1-dimethylamino-4-methyl-1-penten-3-one.

EXAMPLE 7

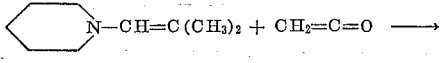

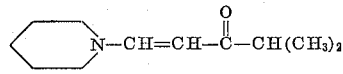

A solution of 420 g. (3.0 moles) of N-isobutenylpiperidine in 500 ml. of ethyl ether was cooled in an ice bath. To this stirred solution was added 126 g. (3.0 moles) of ketene over a period of 3 hrs. The reaction temperature was maintained at 15–20° C. The solution was distilled through an 18-in. packed column to give 464.4 g. (85%) of 4-methyl-1-piperidino-1-penten-3-one, B.P. 133° C. (1.7 mm.), $n_D^{20}$ 1.5485.

*Analysis.*—Calcd. for $C_{11}H_{19}NO$: C, 72.9; H, 10.5; N, 7.7. Found: C, 72.9; H, 10.2; N, 7.9.

EXAMPLE 8

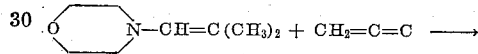

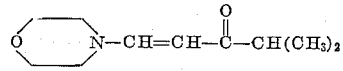

A solution of 423 g. (3.0 moles) of N-isobutenylmorpholine in 500 ml. of ethyl ether was cooled in an ice bath. To this stirred solution was added 126 g. (3.0 moles) of ketene over a 3 hr. period. The reaction temperature was maintained at 15–20° C. Distillation of the reaction solution through an 18-in. packed column gave 448.3 g. (82%) of 4-methyl-1-morpholino-1-penten-3-one, B.P. 133–134° C. (1 mm.), $n_D^{20}$ 1.5518.

*Analysis.*—Calcd. for $C_{10}H_{17}NO_2$: C, 65.6; H, 9.3; N, 7.7. Found: C, 66.0; H, 9.4; N, 7.6.

EXAMPLE 9

$(CH_3)_2C=CH-N(CH_2CH_2CN)_2 + CH_2=C=O \longrightarrow$

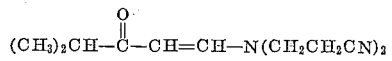

A solution of 81.4 g. (0.46 mole) of N-isobutenyliminodipropionitrile in 300 ml. of ethyl ether was cooled in an ice bath. To this stirred solution was added 21 g. (0.5 mole) of ketene. An oily layer settled out, which crystallized on standing. The reaction mixture was evaporated on a steam bath to give a solid, brown residue. This material was recrystallized from ethanol to give 90.1 g. (89%) of 1-(N-iminodipropionitrile-4-methyl-1-penten-3-one, M.P. 158–159° C.

*Analysis.*—Calcd. for $C_{12}H_{17}N_3O$: C, 65.7; H, 7.8; N, 19.2. Found: C, 65.3; H, 7.8; N, 18.9.

EXAMPLE 10

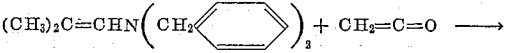

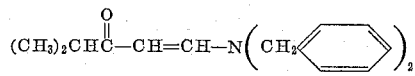

A solution of 150 g. (0.6 mole) of N-isobutenyldibenzylamine in 300 ml. of acetonitrile was cooled to 10° C. Ketene was passed into this solution until a weight increase of 25.2 g. (0.6 mole) took place. The low boilers were taken off through a 6-in. Vigreux column, and the residue was distilled in a molecular still to give 105 g. (60%) of 1-(dibenzylamino)-4-methyl-1-penten-3-one, B.P. 105° C. (2.5μ). This material solidified upon cooling.

EXAMPLE 11

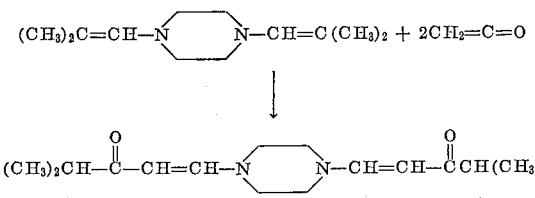

A solution of 194 g. (1.0 mole) of 1,4-diisobutenyl-piperazine in 400 ml. of ethyl ether was cooled in an ice bath. Ketene was added until a weight increase of 84 g. (2.0 moles) took place. A large amount of solid precipitated. The entire reaction mixture was evaporated on a steam bath to give 265 g. of solid residue. This was recrystallized from a mixture of water and ethanol to give 201.7 g. (73%) of 1,4-piperazinyl-1,1'-bis[4-methyl-1-penten-3-one], M.P. 253–254° C.

*Analysis.*—Calcd. for $C_{16}H_{26}N_2O_3$: C, 69.0; H, 9.4; N, 10.1. Found: C, 68.8; H, 9.3; N, 10.3.

EXAMPLE 12

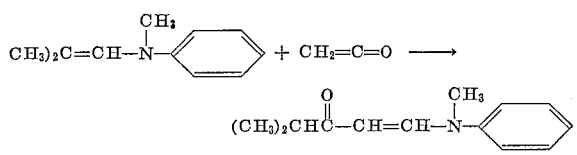

A solution of 134.6 g. (0.84 mole) of N-isobutenyl-N-methylaniline in 300 ml. of ethyl acetate was chilled in an ice bath. To this stirred solution was added 35.3 g. (0.85 mole) of ketene. The reaction mixture was evaporated on a steam bath and the residue fractionated through a spinning band column to give 39.3 g. (23%) of 1-(N-methylanilino)-4-methyl-1-penten-3-one, B.P. 126° C. (0.7 mm.), $n_D^{20}$ 1.6074.

*Analysis.*—Calcd. for $C_{13}H_{17}NO$: C, 76.9; H, 8.4; N, 6.8. Found: C, 76.7; H, 8.2; N, 6.7.

Table II below provides additional examples of products obtained by the general method of Example 9 in reacting ketene with various enamines having no β-hydrogen atoms.

*Table II*

| Enamine | Product | B.P. |
|---|---|---|
| 1-(Cyclohexylidenemethyl)-piperidine. | 3-Cyclohexyl-1-piperidino-1-propen-3-one. | 150–152° C. (1 mm.). |
| 3-Isobutenyl-3-aza-bicyclo-[3.2.2]nonane. | 1-(3-Azabicyclo[3.2.2] nonan-3-yl)-4-methyl-1-penten-3-one. | 165–168° C. (2 mm.). |
| N-(2-ethyl-1-butenyl) piperidine. | 4-Ethyl-1-piperidino-1-hexen-3-one. | 148° C. (1.5 mm.). |
| N,N-dimethyl-2-ethyl-1-butenylamine. | 1-Dimethylamino-4-ethyl-1-hexen-3-one. | 100–103° C. (0.8 mm.). |

The tertiaryamino unsaturated ketones prepared by my invention can be converted into a number of useful heterocyclic compounds as illustrated by the following examples. For instance, the substituted pyrazoles as prepared in Examples 13 and 14 are members of a class of compounds that are useful as stabilizers in poly(vinyl chloride), as disclosed by Roos et al., U.S. 2,946,765.

EXAMPLE 13

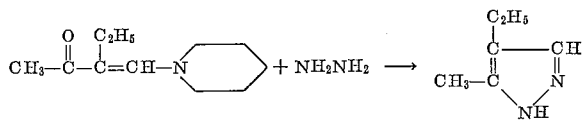

To a stirred suspension of 39 g. (0.3 mole) of hydrazine sulfate in 80 ml. of water was added dropwise 54.3 g. (0.3 mole) of 2-ethyl-1-piperidino-1-buten-3-one. The addition rate was adjusted so that the temperature stayed at approximately 50–55° C. After the addition was complete, the reaction solution was heated by a steam bath for 4 hr. The cooled solution was made alkaline with 20% aqueous sodium hydroxide and extracted with ethyl ether. After drying over anhydrous magnesium sulfate, the ether solution was distilled to give 25.1 g. (76%) of 4-ethyl-5-methylpyrazole, B.P. 101–103° C. (5 mm.).

*Analysis.*—Calcd. for $C_6H_{10}N_2$: N, 25.4. Found: N, 25.2.

EXAMPLE 14

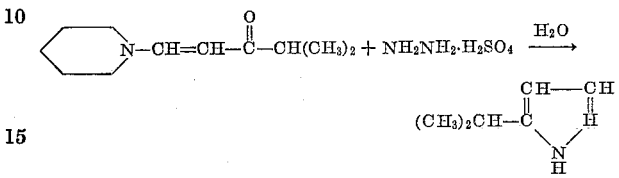

To a stirred suspension of 39 g. (0.3 mole) of hydrazine sulfate in 80 ml. of water was added dropwise 54 g. (0.3 mole) of 4-(methyl-1-piperidino-1-penten-3-one. The addition rate was adjusted so that the temperature stayed at approximately 50° C. After the addition was complete, the reaction solution was heated by a steam bath for 3 hr. The cooled solution was made alkaline with 20% aqueous sodium hydroxide and extracted with ethyl ether. After drying over anhydrous magnesium sulfate, the ether solution was distilled to give 26.8 g. (82%) of 5-isopropylpyrazole, B.P. 115° C. (12 mm.), $n_D^{20}$ 1.4850.

*Analysis.*—Calcd. for $C_6H_{10}N_2$: C, 65.5; H, 9.1; N, 25.4. Found: C, 65.2; H, 9.3; N, 25.3.

EXAMPLE 15

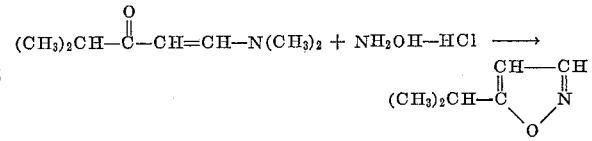

To a stirred solution of 70.5 g. (0.5 mole) of 4-methyl-1-dimethylamino-1-penten-3-one in 30 ml. of water was slowly added a solution of 35 g. (0.5 mole) of hydroxylamine hydrochloride in 40 ml. of water. The temperature rose to 50° C. during the addition. The solution was heated on a steam bath for 2 hr.; cooled and made alkaline with sodium hydroxide. The organic layer was taken up in ether and dried over anhydrous magnesium sulfate. Distillation through a 10-in. packed column gave 47.3 g. (86%) of 5-isopropylisoxazole, B.P. 67° C. (36 mm.).

*Analysis.*—Calcd. for $C_6H_9NO$: C, 64.9; H, 8.1; N, 12.6. Found: C, 64.8; H, 8.1; N, 12.5.

EXAMPLE 16

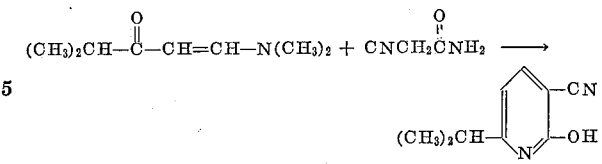

A solution containing 70.5 g. (0.5 mole) of 1-dimethylamino-4-methyl-1-penten-3-one, 42 g. (0.5 mole) of cyanoacetamide and 5 ml. of acetic acid in 200 ml. of water was refluxed for several hr. A large amount of solid came out of solution. The reaction mixture was cooled and made alkaline with sodium hydroxide. The solid was removed by filtration. After drying, it weighed 57.5 g. (71%) and was found to be 3-cyano-2-hydroxy-6-isopropylpyridine, M.P. 208.5–210° C.

*Analysis.*—Calcd. for $C_9H_{12}N_2$: C, 66.7; H, 6.2; N, 17.3. Found: C, 66.9; H, 6.3; N, 17.1.

The invention has been described in considerable detail with particular reference to certain preferred embodiments thereof, but it will be understood that variations and modifications can be effected within the spirit and scope of the invention as described hereinabove, and as defined in the appended claims.

I claim:
1. The process which comprises reacting an enamine having the formula:

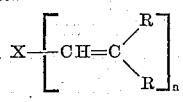

with a ketene having the formula:

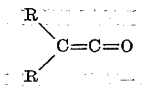

at a temperature in the range of 10° C. to 200° C. and forming an unsaturated, open-chain tertiary amino ketone having the formula:

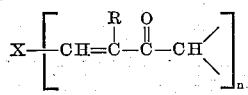

wherein the substituents, R, of the enamine, taken singly, are each selected from the group consisting of:
  (a) hydrogen,
  (b) alkyl of 1 to 5 carbon atoms,
  (c) phenyl, and
  (d) thienyl
and wherein the substituents, R, of the enamine taken collectively with the carbon atom to which they are attached, represent a member selected from the group consisting of:

(a)
(b)
and
(c)

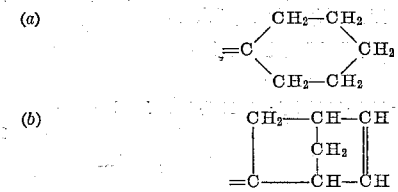

wherein the substituents, R, of the ketene taken singly, are each selected from the group consisting of:
  (a) hydrogen,
  (b) alkyl of 1 to 18 carbon atoms,
  (c) phenyl,
  (d) lower alkyl substituted phenyl,
  (e) benzyl,
  (f) allyl and
  (g) carbalkoxy
wherein the alkyl moiety is lower alkyl and wherein the substituents, R, of the ketene, taken collectively with the carbon atom to which they are attached, represent a member selected from the group consisting of:

(a)
(b)

(c)

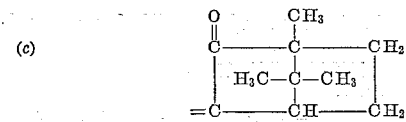

wherein $n$ is an integer from 1 to 2 and X, when $n$ is 1, is a tertiaryamino radical of the formula:

wherein the substituents, $R^1$ and $R^2$, of the tertiaryamino radical, taken singly, are each selected from the group consisting of:
  (a) lower alkyl,
  (b) benzyl and
  (c) cyanoethylene,
and wherein the substituents, $R^1$ and $R^2$, of the tertiary-amino radical, taken collectively with the nitrogen atom to which they are attached, represent a member selected from the group consisting of:

(a)
(b)
c)
and
(d)

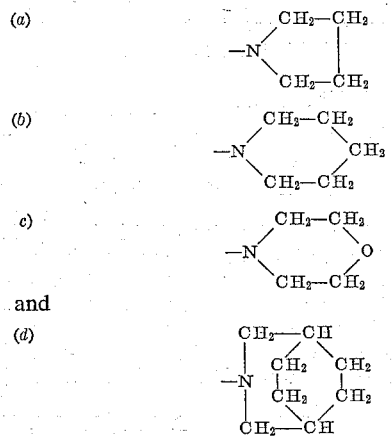

and X, when $n$ is 2, the divalent 1,4-piperazine; wherein at least 1 of said substituents R is hydrogen.

2. The process which comprises reacting dimethylketene with N-(1-butenyl)piperidine at a temperature in the range of 10° C. to 100° C. and sufficiently high to form 2-ethyl-4-methyl-1-piperidino-1-penten-3-one.

3. The process which comprises reacting ketene with N-(1-butenyl)piperidine at a temperature in the range of 10° C. to 100° C. and sufficiently high to form 2-ethyl-1-piperidino-1-buten-3-one.

4. The process which comprises reacting ketene with N,N-dimethylisobutenylamine at a temperature in the range of 10° C. to 100° C. and sufficiently high to form 1-dimethylamino 4-methyl-1-penten-3-one.

5. The process which comprises reacting ketene with N-isobutenylpiperidine at a temperature in the range of 10° C. to 100° C. and sufficiently high to form 4-methyl-1-piperidino-1-penten-3-one.

6. The process which comprises reacting ketene with N-isobutenylmorpholine at a temperature in the range of 10° C. to 100° C. and sufficiently high to form 4-methyl-1-morpholino-1-penten-3-one.

No references cited.

UNITED STATES PATENT OFFICE
CERTIFICATE OF CORRECTION

Patent No. 3,141,880                                      July 21, 1964

James C. Martin

It is hereby certified that error appears in the above numbered patent requiring correction and that the said Letters Patent should read as corrected below.

Column 7, line 51, for "mols" read -- moles --; column 8, lines 30 and 31, for that portion of the formula reading:

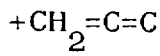                    read                    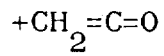

column 9, lines 25 to 30, for that portion of the formula reading:

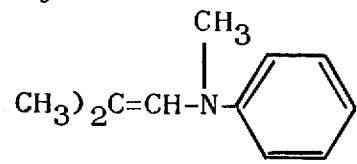        read        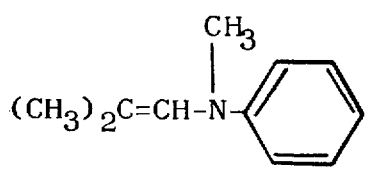

column 10, lines 10 to 17, for that portion of the formula reading:

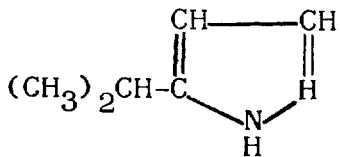        read        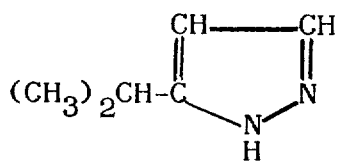

same column 10, line 20, for "4-(methyl-" read -- 4-methyl- --; column 11, lines 16 to 19, the formula should appear as shown below instead of as in the patent:

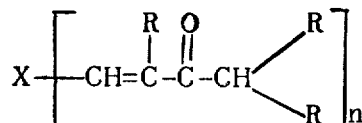

column 12, line 41, for "the" read -- is --.

Signed and sealed this 12th day of January 1965.

(SEAL)
Attest:

ERNEST W. SWIDER                            EDWARD J. BRENNER
Attesting Officer                             Commissioner of Patents